US011731476B1

(12) United States Patent
Carter (10) Patent No.: US 11,731,476 B1
(45) Date of Patent: *Aug. 22, 2023

(54) MOTION CONTROL SYSTEMS (71) Applicant: APPLE INC., Cupertino, CA (US)

(72) Inventor: Troy A. Carter, Sunnyvale, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/506,118

(22) Filed: Oct. 20, 2021

Related U.S. Application Data

(63) Continuation of application No. 16/902,821, filed on Jun. 16, 2020, now Pat. No. 11,179,991.

(60) Provisional application No. 62/904,186, filed on Sep. 23, 2019.

(51) Int. Cl.
B60G 11/27 (2006.01)
B60G 17/015 (2006.01)
B60G 11/30 (2006.01)
B60G 7/00 (2006.01)

(52) U.S. Cl.
CPC .............. B60G 11/27 (2013.01); B60G 7/006 (2013.01); B60G 11/30 (2013.01); B60G 17/0155 (2013.01); B60G 2202/152 (2013.01); B60G 2202/154 (2013.01); B60G 2204/143 (2013.01); B60G 2204/148 (2013.01)

(58) Field of Classification Search
CPC ........ B60G 11/27; B60G 7/006; B60G 11/30; B60G 17/0155; B60G 2202/152; B60G 2202/154; B60G 2204/143; B60G 2204/148
See application file for complete search history.

(56) References Cited

U.S. PATENT DOCUMENTS

| 2,757,938 | A | 8/1956 | Crowder |
| 2,901,239 | A | 8/1959 | Sethna |
| 2,913,252 | A | 11/1959 | Norrie |
| 3,089,710 | A | 5/1963 | Fiala |
| 3,236,334 | A | 2/1966 | Wallerstein, Jr. |

(Continued)

FOREIGN PATENT DOCUMENTS

| CN | 108215946 A | 6/2018 |
| CN | 208439009 U | 1/2019 |

(Continued)

OTHER PUBLICATIONS

Monroe Intelligent Suspension, "CVSA2/Kinetic: Low Energy for High Performance", www.monroeintelligentsuspension.com/products/cvsa2-kinetic/, Date Unknown, Downloaded Mar. 2, 2017, 2 pp.

(Continued)

*Primary Examiner* — Toan C To
(74) *Attorney, Agent, or Firm* — Young Basile Hanlon & MacFarlane, P.C.

(57) ABSTRACT

A motion control system includes a spring that supports a body structure with respect to a rotating assembly, the spring including an internal working volume, a structure that is connected between the spring and the rotating assembly, and a reservoir that is located in the structure. The reservoir is in fluid communication with the internal working volume of the spring to allow exchange of air between the internal working volume of the spring and the reservoir.

21 Claims, 8 Drawing Sheets

(56) References Cited

U.S. PATENT DOCUMENTS

| | | | |
|---|---|---|---|
| 3,322,379 A | 5/1967 | Flannelly |
| 3,368,824 A | 2/1968 | Julien |
| 3,441,238 A | 4/1969 | Flannelly |
| 3,781,032 A | 12/1973 | Jones |
| 3,970,162 A | 7/1976 | Le Salver et al. |
| 4,206,935 A | 6/1980 | Sheppard et al. |
| 4,379,572 A | 4/1983 | Hedenberg |
| 4,530,514 A | 7/1985 | Ito |
| 4,537,420 A | 8/1985 | Ito et al. |
| 4,589,678 A | 5/1986 | Lund |
| 4,613,152 A | 9/1986 | Booher |
| 4,614,359 A | 9/1986 | Lundin et al. |
| 4,634,142 A | 1/1987 | Woods et al. |
| 4,637,628 A | 1/1987 | Perkins |
| 4,643,270 A | 2/1987 | Beer |
| 4,659,106 A | 4/1987 | Fujita et al. |
| 4,722,516 A | 2/1988 | Gregg |
| 4,741,517 A | 5/1988 | Warmuth, II |
| 4,784,378 A | 11/1988 | Ford |
| 4,834,416 A | 5/1989 | Shimoe et al. |
| 4,893,832 A | 1/1990 | Booher |
| 4,922,159 A | 5/1990 | Phillips et al. |
| 4,960,290 A | 10/1990 | Bose |
| 4,981,309 A | 1/1991 | Froeschle et al. |
| 4,991,698 A | 2/1991 | Hanson |
| 5,033,028 A | 7/1991 | Browning |
| 5,060,959 A | 10/1991 | Davis et al. |
| 5,172,930 A | 12/1992 | Boye et al. |
| 5,244,053 A | 9/1993 | Kashiwagi |
| 5,251,926 A | 10/1993 | Aulerich et al. |
| 5,364,081 A | 11/1994 | Hartl |
| 5,401,053 A | 3/1995 | Sahm et al. |
| 5,409,254 A | 4/1995 | Minor et al. |
| 5,468,055 A | 11/1995 | Simon et al. |
| 5,507,518 A | 4/1996 | Nakahara et al. |
| 5,517,414 A | 5/1996 | Hrovat |
| 5,645,250 A | 7/1997 | Gevers |
| 5,678,847 A | 10/1997 | Izawa et al. |
| 5,785,345 A | 7/1998 | Barlas et al. |
| 5,810,335 A | 9/1998 | Wirtz et al. |
| 5,829,764 A | 11/1998 | Griffiths |
| 5,880,542 A | 3/1999 | Leary et al. |
| 6,032,770 A | 3/2000 | Alcone et al. |
| 6,113,119 A | 9/2000 | Laurent et al. |
| 6,142,494 A | 11/2000 | Higuchi |
| 6,170,838 B1 | 1/2001 | Laurent et al. |
| 6,233,510 B1 | 5/2001 | Plainer et al. |
| 6,249,728 B1 | 6/2001 | Streiter |
| 6,276,710 B1 | 8/2001 | Sutton |
| 6,314,353 B1 | 11/2001 | Ohsaku et al. |
| 6,357,770 B1 | 3/2002 | Carpiaux et al. |
| 6,364,078 B1 | 4/2002 | Parison et al. |
| 6,398,236 B1 | 6/2002 | Richardson |
| 6,443,436 B1 | 9/2002 | Schel |
| 6,470,248 B2 | 10/2002 | Shank et al. |
| 6,502,837 B1 | 1/2003 | Hamilton et al. |
| 6,513,819 B1 | 2/2003 | Oliver et al. |
| 6,634,445 B2 | 10/2003 | Dix et al. |
| 6,637,561 B1 | 10/2003 | Collins et al. |
| 6,746,031 B2 | 6/2004 | Carlstedt |
| 6,873,891 B2 | 3/2005 | Moser et al. |
| 6,926,288 B2 | 8/2005 | Bender |
| 6,940,248 B2 | 9/2005 | Maresca et al. |
| 6,945,541 B2 | 9/2005 | Brown |
| 7,017,690 B2 | 3/2006 | Burke |
| 7,032,723 B2 | 4/2006 | Quaglia et al. |
| 7,051,851 B2 | 5/2006 | Svartz et al. |
| 7,140,601 B2 | 11/2006 | Nesbitt et al. |
| 7,195,250 B2 | 3/2007 | Knox et al. |
| 7,202,577 B2 | 4/2007 | Parison et al. |
| 7,243,949 B2 | 7/2007 | Valdez et al. |
| 7,302,825 B2 | 12/2007 | Knox |
| 7,308,351 B2 | 12/2007 | Knoop et al. |
| 7,392,997 B2 | 7/2008 | Sanville et al. |
| 7,401,794 B2 | 7/2008 | Laurent et al. |
| 7,421,954 B2 | 9/2008 | Bose |
| 7,427,072 B2 | 9/2008 | Brown |
| 7,484,744 B2 | 2/2009 | Galazin et al. |
| 7,502,589 B2 | 3/2009 | Howard et al. |
| 7,543,825 B2 | 6/2009 | Yamada |
| 7,551,749 B2 | 6/2009 | Rosen et al. |
| 7,641,010 B2 | 1/2010 | Mizutani et al. |
| 7,644,938 B2 | 1/2010 | Yamada |
| 7,654,540 B2 | 2/2010 | Parison et al. |
| 7,818,109 B2 | 10/2010 | Scully |
| 7,823,891 B2 | 11/2010 | Bushko et al. |
| 7,932,684 B2 | 4/2011 | O'Day et al. |
| 7,962,261 B2 | 6/2011 | Bushko et al. |
| 7,963,529 B2 | 6/2011 | Oteman et al. |
| 7,976,038 B2 | 7/2011 | Gregg |
| 8,047,551 B2 | 11/2011 | Morris et al. |
| 8,067,863 B2 | 11/2011 | Giovanardi |
| 8,095,268 B2 | 1/2012 | Parison et al. |
| 8,099,213 B2 | 1/2012 | Zhang et al. |
| 8,109,371 B2 | 2/2012 | Kondo et al. |
| 8,112,198 B2 | 2/2012 | Parison, Jr. et al. |
| 8,113,522 B2 | 2/2012 | Oteman et al. |
| 8,127,900 B2 | 3/2012 | Inoue |
| 8,157,036 B2 | 4/2012 | Yogo et al. |
| 8,191,874 B2 | 6/2012 | Inoue et al. |
| 8,282,149 B2 | 10/2012 | Kniffin et al. |
| 8,336,319 B2 | 12/2012 | Johnston et al. |
| 8,356,861 B2 | 1/2013 | Kniffin et al. |
| 8,360,387 B2 | 1/2013 | Breen et al. |
| 8,370,022 B2 | 2/2013 | Inoue et al. |
| 8,387,762 B2 | 3/2013 | Kondo et al. |
| 8,417,417 B2 | 4/2013 | Chen et al. |
| 8,428,305 B2 | 4/2013 | Zhang et al. |
| 8,466,639 B2 | 6/2013 | Parison, Jr. et al. |
| 8,490,761 B2 | 7/2013 | Kondo |
| 8,499,903 B2 | 8/2013 | Sakuta et al. |
| 8,548,678 B2 | 10/2013 | Ummethala et al. |
| 8,579,311 B2 | 11/2013 | Butlin, Jr. et al. |
| 8,632,078 B2 | 1/2014 | Ehrlich et al. |
| 8,641,052 B2 | 2/2014 | Kondo et al. |
| 8,641,053 B2 | 2/2014 | Pare et al. |
| 8,668,060 B2 | 3/2014 | Kondo et al. |
| 8,682,530 B2 | 3/2014 | Nakamura |
| 8,701,845 B2 | 4/2014 | Kondo |
| 8,725,351 B1 | 5/2014 | Selden et al. |
| 8,744,680 B2 | 6/2014 | Rieger et al. |
| 8,744,694 B2 | 6/2014 | Ystueta |
| 8,757,309 B2 | 6/2014 | Schmitt et al. |
| 8,783,430 B2 | 7/2014 | Brown |
| 8,890,461 B2 | 11/2014 | Knox et al. |
| 8,930,074 B1 | 1/2015 | Lin |
| 8,938,333 B2 | 1/2015 | Bose et al. |
| 9,062,983 B2 | 6/2015 | Zych |
| 9,079,473 B2 | 7/2015 | Lee et al. |
| 9,102,209 B2 | 8/2015 | Giovanardi et al. |
| 9,156,519 B2 * | 10/2015 | Ripa ..................... B62K 25/04 |
| 9,291,300 B2 | 3/2016 | Parker et al. |
| 9,316,667 B2 | 4/2016 | Ummethala et al. |
| 9,349,304 B2 | 5/2016 | Sangermano, II et al. |
| 9,399,384 B2 | 7/2016 | Lee et al. |
| 9,428,029 B2 | 8/2016 | Job |
| 9,527,359 B2 * | 12/2016 | Son ..................... B62D 61/12 |
| 9,533,539 B2 | 1/2017 | Eng et al. |
| 9,550,495 B2 | 1/2017 | Tatourian et al. |
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,407,035 B1 | 9/2019 | Gadda et al. |
| 10,513,161 B2 | 12/2019 | Anderson et al. |

(56) References Cited

U.S. PATENT DOCUMENTS

| | | | |
|---|---|---|---|
| 11,173,982 B2* | 11/2021 | Angell | F16F 9/0472 |
| 11,179,991 B1* | 11/2021 | Carter | B60G 7/001 |
| 2001/0045719 A1 | 11/2001 | Smith | |
| 2002/0190486 A1 | 12/2002 | Phillis et al. | |
| 2003/0030241 A1 | 2/2003 | Lawson | |
| 2003/0080526 A1 | 5/2003 | Conover | |
| 2004/0054455 A1 | 3/2004 | Voight et al. | |
| 2004/0074720 A1 | 4/2004 | Thieltges | |
| 2004/0094912 A1 | 5/2004 | Niwa et al. | |
| 2004/0226788 A1 | 11/2004 | Tanner | |
| 2004/0245732 A1 | 12/2004 | Kotulla et al. | |
| 2005/0051986 A1 | 3/2005 | Galazin et al. | |
| 2005/0062251 A1 | 3/2005 | Ramsey | |
| 2005/0096171 A1 | 5/2005 | Brown et al. | |
| 2005/0199457 A1 | 9/2005 | Beck | |
| 2005/0206231 A1 | 9/2005 | Lu et al. | |
| 2005/0247496 A1 | 11/2005 | Nagaya | |
| 2006/0043804 A1 | 3/2006 | Kondou | |
| 2006/0076828 A1 | 4/2006 | Lu et al. | |
| 2006/0119064 A1 | 6/2006 | Mizuno et al. | |
| 2006/0181034 A1 | 8/2006 | Wilde et al. | |
| 2006/0266599 A1 | 11/2006 | Denys et al. | |
| 2006/0273530 A1 | 12/2006 | Zuber | |
| 2007/0069496 A1 | 3/2007 | Rinehart et al. | |
| 2007/0107959 A1 | 5/2007 | Suzuki et al. | |
| 2007/0114706 A1 | 5/2007 | Myers | |
| 2007/0199750 A1 | 8/2007 | Suzuki et al. | |
| 2007/0210539 A1 | 9/2007 | Hakui et al. | |
| 2008/0017462 A1 | 1/2008 | Mizutani et al. | |
| 2008/0100020 A1 | 5/2008 | Gashi et al. | |
| 2008/0164111 A1 | 7/2008 | Inoue et al. | |
| 2008/0185807 A1 | 8/2008 | Takenaka | |
| 2008/0283315 A1 | 11/2008 | Suzuki et al. | |
| 2009/0033055 A1 | 2/2009 | Morris et al. | |
| 2009/0064808 A1 | 3/2009 | Parison et al. | |
| 2009/0095584 A1 | 4/2009 | Kondo et al. | |
| 2009/0120745 A1 | 5/2009 | Kondo et al. | |
| 2009/0121398 A1 | 5/2009 | Inoue | |
| 2009/0173585 A1 | 7/2009 | Kappagantu | |
| 2009/0174158 A1 | 7/2009 | Anderson et al. | |
| 2009/0198419 A1 | 8/2009 | Clark | |
| 2009/0218867 A1 | 9/2009 | Clark | |
| 2009/0243402 A1 | 10/2009 | O'Day et al. | |
| 2009/0243598 A1 | 10/2009 | O'Day | |
| 2009/0273147 A1 | 11/2009 | Inoue et al. | |
| 2009/0286910 A1 | 11/2009 | Bloomfield | |
| 2009/0302559 A1 | 12/2009 | Doerfel | |
| 2009/0321201 A1 | 12/2009 | Sakuta et al. | |
| 2010/0044977 A1 | 2/2010 | Hughes et al. | |
| 2010/0059959 A1 | 3/2010 | Kim | |
| 2010/0207344 A1 | 8/2010 | Nakamura | |
| 2010/0222960 A1 | 9/2010 | Oida et al. | |
| 2010/0252376 A1 | 10/2010 | Chern et al. | |
| 2010/0253019 A1 | 10/2010 | Ogawa | |
| 2010/0327573 A1 | 12/2010 | Burns | |
| 2011/0115183 A1 | 5/2011 | Alesso et al. | |
| 2011/0277241 A1 | 11/2011 | Schejbal | |
| 2012/0059547 A1 | 3/2012 | Chen et al. | |
| 2012/0109483 A1 | 5/2012 | O'Dea et al. | |
| 2012/0153718 A1 | 6/2012 | Rawlinson et al. | |
| 2012/0181757 A1 | 7/2012 | Oteman et al. | |
| 2012/0187640 A1 | 7/2012 | Kondo et al. | |
| 2012/0193847 A1 | 8/2012 | Muragishi et al. | |
| 2012/0305348 A1 | 12/2012 | Katayama et al. | |
| 2012/0306170 A1 | 12/2012 | Serbu et al. | |
| 2013/0060422 A1 | 3/2013 | Ogawa et al. | |
| 2013/0060423 A1 | 3/2013 | Jolly | |
| 2013/0099459 A1* | 4/2013 | Remboski | B60G 11/27 280/124.16 |
| 2013/0106074 A1 | 5/2013 | Koku et al. | |
| 2013/0221625 A1 | 8/2013 | Pare et al. | |
| 2013/0229074 A1 | 9/2013 | Haferman et al. | |
| 2013/0233632 A1 | 9/2013 | Kim et al. | |
| 2013/0253764 A1 | 9/2013 | Kikuchi et al. | |
| 2013/0341143 A1 | 12/2013 | Brown | |
| 2014/0005888 A1 | 1/2014 | Bose et al. | |
| 2014/0145498 A1 | 5/2014 | Yamakado et al. | |
| 2014/0156143 A1 | 6/2014 | Evangelou et al. | |
| 2014/0260233 A1 | 9/2014 | Giovanardi et al. | |
| 2014/0312580 A1 | 10/2014 | Gale | |
| 2014/0345450 A1 | 11/2014 | Leonard et al. | |
| 2014/0358378 A1 | 12/2014 | Howard et al. | |
| 2015/0123370 A1 | 5/2015 | Lee et al. | |
| 2015/0197130 A1 | 7/2015 | Smith et al. | |
| 2015/0224845 A1 | 8/2015 | Anderson et al. | |
| 2015/0231942 A1 | 8/2015 | Trangbaek et al. | |
| 2015/0343876 A1 | 12/2015 | Yoshizawa et al. | |
| 2016/0059658 A1 | 3/2016 | Kuriki | |
| 2016/0096458 A1 | 4/2016 | Parker et al. | |
| 2016/0159187 A1 | 6/2016 | Mohamed | |
| 2016/0167743 A1 | 6/2016 | Melcher | |
| 2016/0200164 A1 | 7/2016 | Tabata et al. | |
| 2016/0291574 A1 | 10/2016 | Parison | |
| 2016/0339823 A1 | 11/2016 | Smith et al. | |
| 2016/0347143 A1 | 12/2016 | Hrovat et al. | |
| 2017/0047823 A1 | 2/2017 | Sangermano, III et al. | |
| 2017/0100980 A1 | 4/2017 | Tsuda | |
| 2017/0129367 A1 | 5/2017 | Hein | |
| 2017/0129371 A1 | 5/2017 | Knox | |
| 2017/0129372 A1 | 5/2017 | Hein et al. | |
| 2017/0129373 A1 | 5/2017 | Knox et al. | |
| 2017/0137023 A1 | 5/2017 | Anderson et al. | |
| 2017/0144501 A1 | 5/2017 | Wall | |
| 2017/0203673 A1 | 7/2017 | Parker et al. | |
| 2017/0240018 A1 | 8/2017 | Mettrick et al. | |
| 2017/0241504 A1 | 8/2017 | Delorenzis et al. | |
| 2017/0253101 A1 | 9/2017 | Kuriki | |
| 2017/0253155 A1 | 9/2017 | Knox et al. | |
| 2018/0015801 A1 | 1/2018 | Mohamed et al. | |
| 2018/0022178 A1 | 1/2018 | Xi | |
| 2018/0029585 A1 | 2/2018 | Tanimoto | |
| 2018/0056748 A1 | 3/2018 | Grimes | |
| 2018/0079272 A1 | 3/2018 | Aikin | |
| 2018/0089901 A1 | 3/2018 | Rober et al. | |
| 2018/0105082 A1 | 4/2018 | Knox | |
| 2018/0126816 A1 | 5/2018 | Kondo et al. | |
| 2018/0134111 A1 | 5/2018 | Toyohira et al. | |
| 2018/0162186 A1 | 6/2018 | Anderson et al. | |
| 2018/0162187 A1 | 6/2018 | Trangbaek | |
| 2018/0195570 A1 | 7/2018 | Churchill et al. | |
| 2018/0208009 A1 | 7/2018 | McGuire et al. | |
| 2018/0222274 A1 | 8/2018 | Davis et al. | |
| 2018/0297587 A1 | 10/2018 | Kasaiezadeh Mahabadi et al. | |
| 2018/0345747 A1 | 12/2018 | Boon et al. | |
| 2018/0370314 A1 | 12/2018 | Higle | |
| 2019/0023094 A1 | 1/2019 | Panagis et al. | |
| 2019/0118604 A1 | 4/2019 | Suplin et al. | |
| 2019/0248203 A1 | 8/2019 | Krehmer et al. | |
| 2019/0308484 A1 | 10/2019 | Belter et al. | |
| 2020/0088214 A1 | 3/2020 | Woodard et al. | |
| 2020/0171907 A1 | 6/2020 | Hall et al. | |
| 2020/0180386 A1 | 6/2020 | Tabata et al. | |
| 2020/0216128 A1 | 7/2020 | Doerksen | |
| 2021/0061046 A1 | 3/2021 | Simon et al. | |

FOREIGN PATENT DOCUMENTS

| | | |
|---|---|---|
| DE | 19853876 A1 | 5/2000 |
| DE | 19850169 C1 | 7/2000 |
| DE | 102009060213 A1 | 6/2011 |
| DE | 102010041404 A1 | 3/2012 |
| DE | 202012002846 U1 | 7/2012 |
| DE | 102015003530 A1 | 9/2016 |
| DE | 102016000686 A1 | 7/2017 |
| DE | 102018208774 A1 | 12/2019 |
| EP | 1440826 A2 | 7/2004 |
| EP | 1693233 B1 | 4/2009 |
| EP | 2072855 A1 | 6/2009 |
| EP | 2233330 B1 | 2/2013 |
| EP | 3088230 A1 | 11/2016 |
| GB | 2220625 A | 1/1990 |
| GB | 2437633 A | 10/2007 |
| JP | H0475248 U | 3/1992 |
| JP | 2004155258 A | 6/2004 |

(56) References Cited

FOREIGN PATENT DOCUMENTS

| | | |
|---|---|---|
| JP | 2006200734 A | 8/2006 |
| JP | 2012002300 A | 1/2012 |
| JP | 2012167757 A | 9/2012 |
| JP | 2013244841 A | 12/2013 |
| JP | 5796315 B2 | 10/2015 |
| KR | 101509600 B1 | 4/2015 |
| KR | 20170095073 A | 8/2017 |
| WO | 9304883 A1 | 3/1993 |
| WO | 2011148792 A1 | 12/2011 |
| WO | 2012028228 A2 | 3/2012 |
| WO | 2014004118 A1 | 1/2014 |
| WO | 2014004119 A1 | 1/2014 |
| WO | 2014094934 A1 | 6/2014 |
| WO | 2015153811 A1 | 10/2015 |
| WO | 2015169530 A1 | 11/2015 |
| WO | 2016120044 A1 | 8/2016 |
| WO | 2017055151 A1 | 4/2017 |

OTHER PUBLICATIONS

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et al., "Design and Analysis of a Double-Stator Linear-Rotary Permanent-Magnet Motor", IEEE Transactions an Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

Edren, Johannes, "Motion Modelling and Control Strategies of Over-Actuated Vehicles", Doctoral Thesis, Stockholm 2014 (56 pp).

daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

Wikipedia, "Trailing-arm suspension", https://en.wikipedia.org/wiki/Trailing-arm_suspension, downloaded Sep. 3, 2019 (2 pp).

Cosford, J., "Is it a fair fight? Hydraulics vs. electrics", https://www.mobilehydraulictips.com/fair-fight-hydraulics-vs-electrics/, Mar. 28, 2014 (10 pp).

\* cited by examiner

MOTION CONTROL SYSTEMS

CROSS-REFERENCE TO RELATED APPLICATIONS

This application is a continuation of U.S. application Ser. No. 16/902,821 filed on Jun. 16, 2020, which claims the benefit of U.S. Provisional Application No. 62/904,186, filed on Sep. 23, 2019, the contents of which are hereby incorporated by reference herein in their entirety for all purposes.

TECHNICAL FIELD

The application relates generally to motion control systems.

BACKGROUND

Motion control systems support a sprung mass relative to an unsprung mass. The sprung mass is a first part of an object, which typically includes a body having a compartment. The unsprung mass is a second part of the object that typically includes components that support the body and are movable relative to the body. The function of the motion control system is to reduce transmission of vibrations from the unsprung mass to the sprung mass. Causes of vibrations include the horizontal and vertical curvature of a surface that the object moves along, roughness of the surface, imperfections in the surface, and debris on the surface.

SUMMARY

One aspect of the disclosure is a vehicle that includes a vehicle structure, a wheel assembly, a control arm that is connected to the wheel assembly and to the vehicle structure by pivot joints, and an active suspension actuator that is connected to the control arm and to the vehicle structure to apply forces between the control arm and the vehicle structure. The vehicle also includes an air reservoir that includes a first port and an air spring that supports the vehicle structure with respect to the control arm and is able to compress and expand. The air spring includes an internal working volume, the air spring includes a second port that is in fluid communication with the internal working volume, and the second port is connected to the first port to allow exchange of air between the internal working volume of the air spring and the air reservoir in response to compression and expansion of the air spring.

In some implementations, the air reservoir is located in the control arm. In some implementations, the air reservoir is located in the vehicle structure.

In some implementations, the second port is located at a bottom end portion of the air spring. In some implementations, the second port is located at a top end portion of the air spring.

In some implementations, the air spring includes a lower housing, the air spring includes an upper housing, the air spring includes a flexible panel that is connected to the lower housing and the upper housing, and the second port is formed through the lower housing.

In some implementations, the air spring includes a lower housing, the air spring includes an upper housing, the air spring includes a flexible panel that is connected to the lower housing and the upper housing, and the second port is formed through the upper housing.

Another aspect of the disclosure is a vehicle suspension system that supports a vehicle structure with respect to a wheel assembly. The vehicle suspension system includes a control arm that is connected to the wheel assembly and is connected to vehicle structure. The vehicle suspension also includes an air reservoir that is located inside the control arm. The vehicle suspension system also includes an air spring. The air spring supports the vehicle structure with respect to the control arm and is able to compress and expand. The air spring includes an internal working volume that is in fluid communication with the air reservoir to allow exchange of air between the internal working volume of the air spring and the air reservoir in response to compression and expansion of the air spring.

In some implementations, the air reservoir is in fluid communication with the air spring through a port that is located on a top surface of the control arm.

In some implementations, the air reservoir is defined by a hollow interior of the control arm. The hollow interior of the control arm may be substantially sealed with respect to an external environment.

In some implementations, the air reservoir is defined by a tank that is located inside a hollow interior of the control arm.

In some implementations, an upper end of the air spring is connected to the vehicle structure and a lower end of the air spring is connected to the control arm. In some implementations, a first port is formed in a top surface of the control arm, a second port is formed in the lower end of the air spring, and the first port is connected to the second port to allow transfer of air between the air spring and the air reservoir.

The vehicle suspension system may also include an active suspension actuator for applying forces between the vehicle structure and the wheel assembly. In some implementations, the active suspension actuator has an upper end that is connected to the vehicle structure and a lower end that is connected to the control arm.

Another aspect of the disclosure is a vehicle that includes a vehicle structure, a wheel assembly, a control arm that is connected to the wheel assembly and is connected to vehicle structure, an air reservoir that is located inside the vehicle structure and includes a first port that is formed in a surface of the vehicle structure, and an air spring. The air spring supports the vehicle structure with respect to the control arm and is able to compress and expand. The air spring includes a second port that is connected to the first port to allow fluid communication between an internal working volume of the air spring and the air reservoir to define a total working volume for the air spring that includes the internal working volume and the air reservoir.

In some implementations, the air reservoir is defined by a hollow interior of the vehicle structure that is substantially sealed with respect to an external environment. In some implementations, the air reservoir is defined by a tank that is located inside a hollow interior of the vehicle structure.

In some implementations, an upper end of the air spring is connected to the vehicle structure, a lower end of the air spring is connected to the control arm, and the second port is formed in the upper end of the air spring.

DETAILED DESCRIPTION

The description herein relates to suspension systems that include an air spring and a reservoir that holds air that can be used by the air spring to increase the working volume of the air spring. The reservoir is located inside a vehicle component that is positioned either at a first (e.g., lower) end of the air spring or at second (e.g., upper) end of the air spring.

The air spring and reservoir configurations that are described herein reduce the stiffness of the air spring by increasing the working volume of air that is available to the air spring. Because the air spring is located inside a vehicle component that is positioned at an end of the air spring and adjacent to the air spring, this increase in working volume is achieved without increasing the size of the air spring itself, and without incurring the air pressure losses associated with use of a remotely-positioned air tank.

Figure 1:
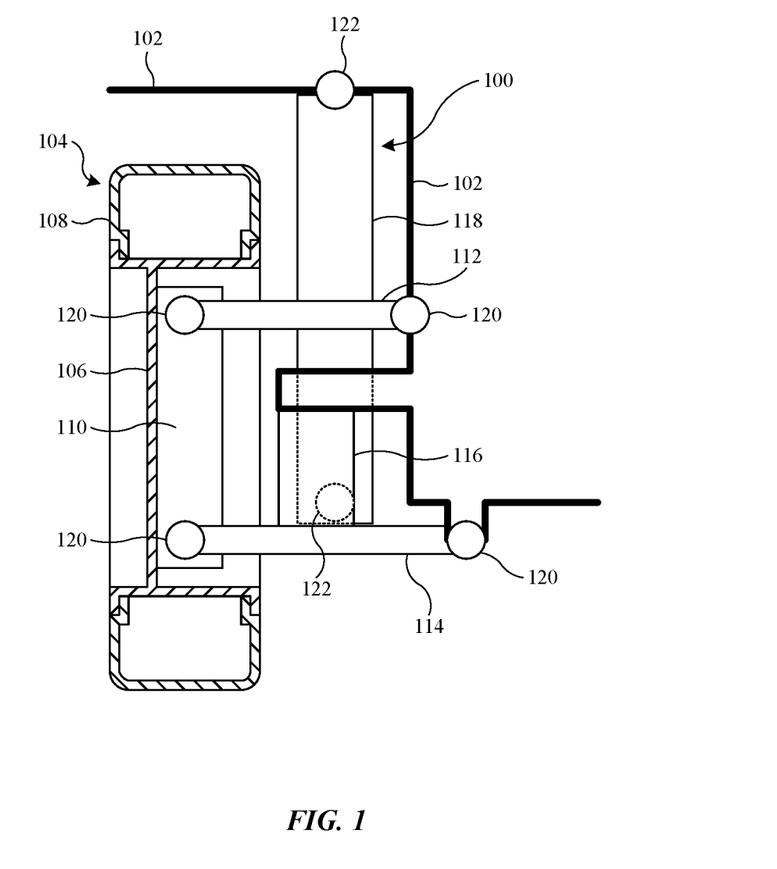
FIG. 1 is an illustration that shows a vehicle suspension system that supports a vehicle structure with respect to a wheel assembly.

FIG. 1 is an illustration that shows a vehicle suspension system 100 that supports a vehicle structure 102 with respect to a wheel assembly 104. The vehicle suspension system 100 is configured to reduce transmission of vibrations to a sprung mass from an unsprung mass using passive suspension components and active suspension components. In this example, the sprung mass is the vehicle structure 102 and the unsprung mass is the wheel assembly 104. The configuration of the vehicle suspension system 100 and the wheel assembly 104 is an example of a configuration that can be used to connect multiple wheel assemblies (e.g., four total wheel assemblies) to the vehicle structure 102 in order to support the vehicle structure 102 relative to a roadway surface or other surface.

The vehicle structure 102 includes components that are part of the sprung mass of the vehicle. The vehicle structure 102 may be a multi-part structure. The vehicle structure 102 may include a frame, a subframe, a unibody, a body, a monocoque, and/or other types of vehicle frame and body structures. The vehicle structure 102 may include or support components that define internal structural portions of the vehicle (e.g., frame rails, structural pillars, etc.), and external aesthetic portions of the vehicle (e.g., body panels).

The wheel assembly 104 includes a wheel 106, a tire 108, and a wheel hub 110. The wheel 106, the tire 108, and the wheel hub 110 are all conventional components. For example, the wheel 106 may be a steel wheel of conventional design that supports the tire 108, which may be a pneumatic tire. The wheel hub 110 is fixed against rotation by components of the vehicle suspension system 100. The wheel 106 and the tire 108 are supported by the wheel hub 110 so that they may rotate. Propulsion, steering, and/or braking components may also be connected to and or integrated into the wheel 106 and/or the wheel hub 110.

To support the vehicle structure 102 with respect to wheel assembly 104, the vehicle suspension system 100 may include an upper control arm 112, a lower control arm 114, an air spring 116, and an active suspension actuator 118.

The upper control arm 112 and the lower control arm 114 connect the wheel hub 110 to the vehicle structure 102 such that the wheel hub 110 is movable with respect to the vehicle structure 102, primarily in a generally vertical direction. As an example, the upper control arm 112 and the lower control arm 114 may each be connected to the vehicle structure 102 and to the wheel hub 110 by pivot joints 120 that allow rotation in one or more rotational degrees of freedom. The air spring 116 may be connected in parallel with the active suspension actuator 118 in order to carry most of the static load that is applied to the wheel assembly 104 by the vehicle structure 102.

The active suspension actuator 118 is operable to apply forces to the vehicle structure 102 and to the wheel assembly 104 through the lower control arm 114 in the illustrated example. It should be understood that other configurations of the vehicle suspension system 100 could use different configurations in which the active suspension actuator is connected to the sprung mass and the unsprung mass differently.

The active suspension actuator 118 is configured to apply forces to the vehicle structure 102 and to the wheel assembly 104. The active suspension actuator 118 may be connected to these components directly or indirectly using joints or other structures. In the illustrated example, the active suspension actuator 118 is connected to the vehicle structure 102 and to the lower control arm 114 by pivot joints 122. In the illustrated example, the active suspension actuator 118 has an upper end that is connected to the vehicle structure 102 by one of the pivot joints 122 and a lower end that is connected to the lower control arm 114 by another one of the pivot joints 122.

Operation of the active suspension actuator 118 can be controlled to control accelerations of the vehicle structure 102 relative to the wheel assembly 104. For example, the active suspension actuator 118 can be controlled to extend and retract to apply forces between the vehicle structure 102 and the wheel assembly 104 in positive and negative directions.

The active suspension actuator 118 may be a linear actuator or another type of actuator. As one example, the active suspension actuator 118 may be a hydraulic piston-cylinder actuator. As another example, the active suspension actuator 118 may be a pneumatic piston-cylinder actuator. As another example, the active suspension actuator 118 may be a pneumatic air spring. As another example, the active suspension actuator 118 may be an electromagnetic linear actuator. As another example, the active suspension actuator 118 may be a ball screw linear actuators that is driven by an electric motor. Other types of actuators may be used as the active suspension actuator 118 to implement active suspension control.

Figure 2:
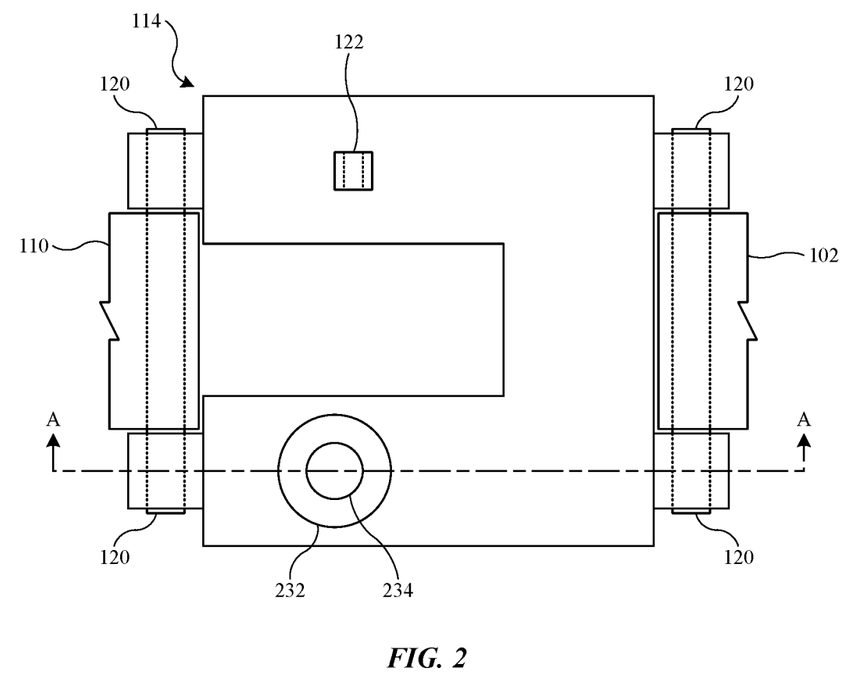
FIG. 2 is a top view illustration showing a lower control arm of the vehicle suspension system.
Figure 3:
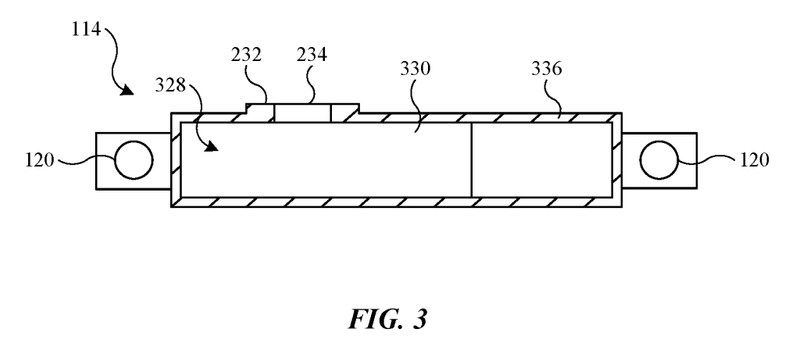
FIG. 3 is a cross-section illustration taken on line A-A of FIG. 2 showing the lower control arm of the vehicle suspension system.

FIG. 2 is a top view illustration showing the lower control arm 114 of the vehicle suspension system 100 and FIG. 3 is a cross-section illustration taken on line A-A of FIG. 2 showing the lower control arm 114 of the vehicle suspension system 100. In addition to being connected to the wheel assembly 104 and the vehicle structure 102, the lower control arm 114 also includes an air reservoir 328 that is located inside the lower control arm 114. The air reservoir 328 provides an additional volume of working fluid (air) that is usable by the air spring 116 during compression and expansion of the air spring. In contrast to the air spring 116, the air reservoir 328 may be a substantially rigid vessel that has a fixed volume and is not able to expand and contract.

In the illustrated example, the air reservoir 328 is defined by the hollow interior 330 of the lower control arm 114. The air reservoir 328 reduces the stiffness of the air spring 116 by increasing the total working volume of air that is available to the air spring 116. Thus, the stiffness of the air spring 116 can be controlled (in part) by the volume of the hollow interior 330 that is provided for use as the air reservoir 328 for use by the air spring 116.

The lower control arm 114 is pivotally connected to the wheel assembly 104 by the pivot joints 120. The lower control arm 114 is also pivotally connected to the vehicle structure 102 by the pivot joints 120. In the illustrated example, the pivot joints 120 are pin-type joints that each allow rotation in one degree of rotational freedom around a pin axis of the joint. Over a relatively small range of motion, connection of the wheel assembly 104 to the vehicle structure 102 by the lower control arm 114 allows the wheel assembly 104 to approximate vertical motion.

The lower control arm 114 includes a mount 232 at which the lower control arm 114 is connectable to the air spring 116. The mount 232 is an area where the air spring 116 contacts the lower control arm 114 and is connected to the lower control arm 114. A control arm port 234 is formed in the lower control arm 114 to allow exchange of air between the air spring 116 and the air reservoir 328 defined within the hollow interior 330 of the lower control arm 114. The control arm port 234 may be located near the mount 232 and therefore is located at a lower end portion of the air spring 116 such that the air reservoir 328 is adjacent to the lower end portion of the air spring 116. In the illustrated example, the control arm port 234 is an opening that is located at or near the center of the mount 232 and is formed through the lower control arm 114 such that it extends from an exterior surface of the lower control arm 114 to the hollow interior 330 of the lower control arm 114 in order to allow direct exchange of air between the interior of the air spring 116 and the air reservoir 328 defined by the hollow interior 330 of the lower control arm 114, as will be explained further herein. In other implementations, the air reservoir 328 defined by the hollow interior 330 of the air spring 116 may be in fluid communication with the interior of the air spring 116 by a short conduit, passage, or other fluid communication structure that connects the interior of the air spring 116 to the air reservoir 328 defined by the hollow interior 330 of the lower control arm 114 in a manner that allows fluid communication.

The hollow interior 330 of the lower control arm 114 is bounded by wall portions 336. In one implementation, the wall portions 336 are sealed with respect to each other to define the air reservoir 328 within the wall portions 336 of the hollow interior 330 of the lower control arm 114. Thus, the hollow interior 330 is substantially sealed with respect to an external environment that the suspension system 100 is located in. As used herein, "substantially sealed" means that air may be contained within the air reservoir 328 under pressure within only minor losses during normal operation and other than intentional depressurization (e.g., through a valve that vents to atmosphere or through supply line to another component), only minor losses in air pressure occur.

As an example, the hollow interior 330 may be substantially sealed to define the air reservoir 328 by sealing of the wall portions 336 with respect to each other such that the hollow interior 330 defines a substantially sealed volume within the lower control arm 114. With the remainder of the hollow interior 330 being substantially sealed, air exchange between the air reservoir 328 and the air spring 116 occurs through the control arm port 234, which extends through one of the wall portions of the lower control arm 114.

Figure 4:
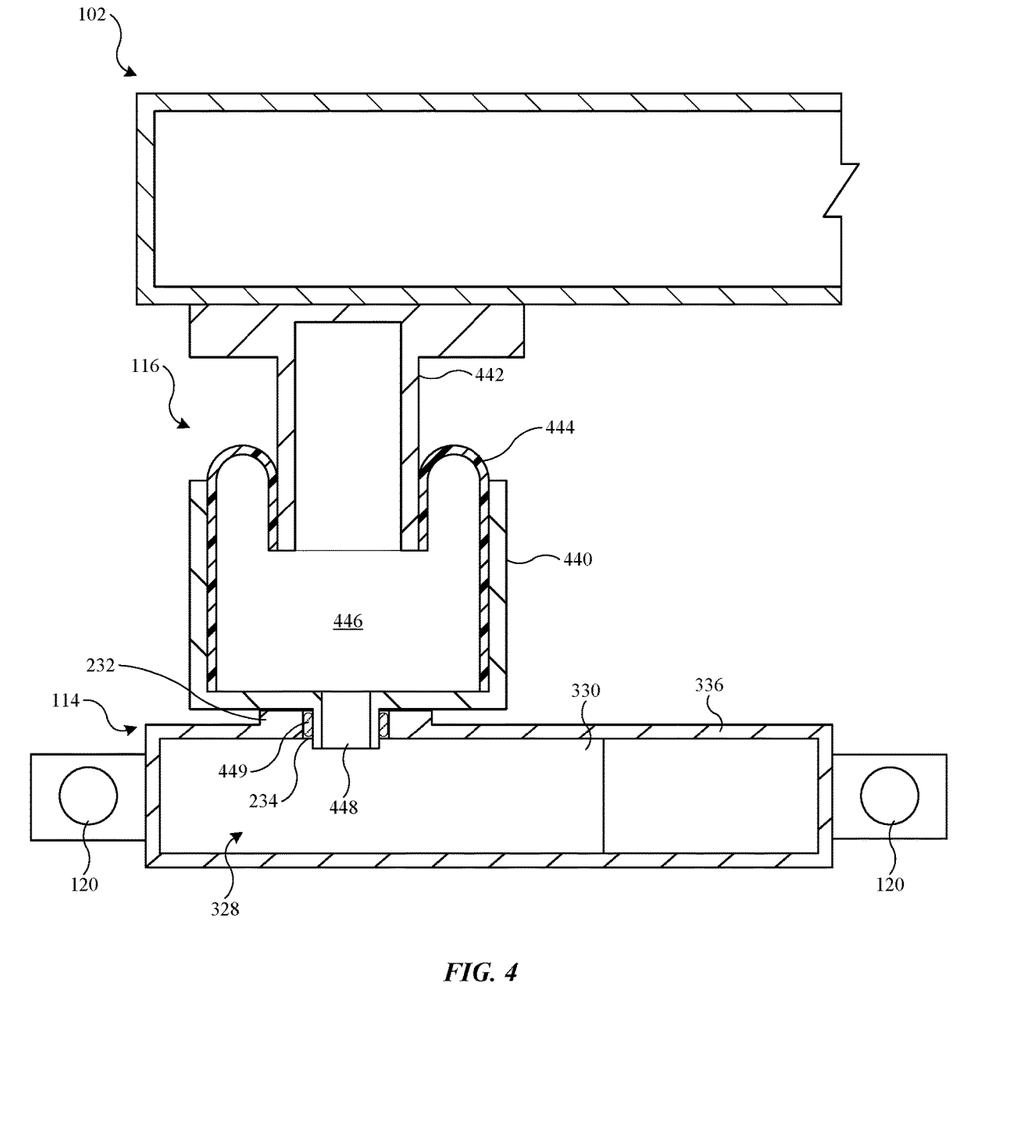
FIG. 4 is a cross-section illustration showing an air spring, the lower control arm, and the vehicle structure with the air spring in an expanded position.
Figure 5:
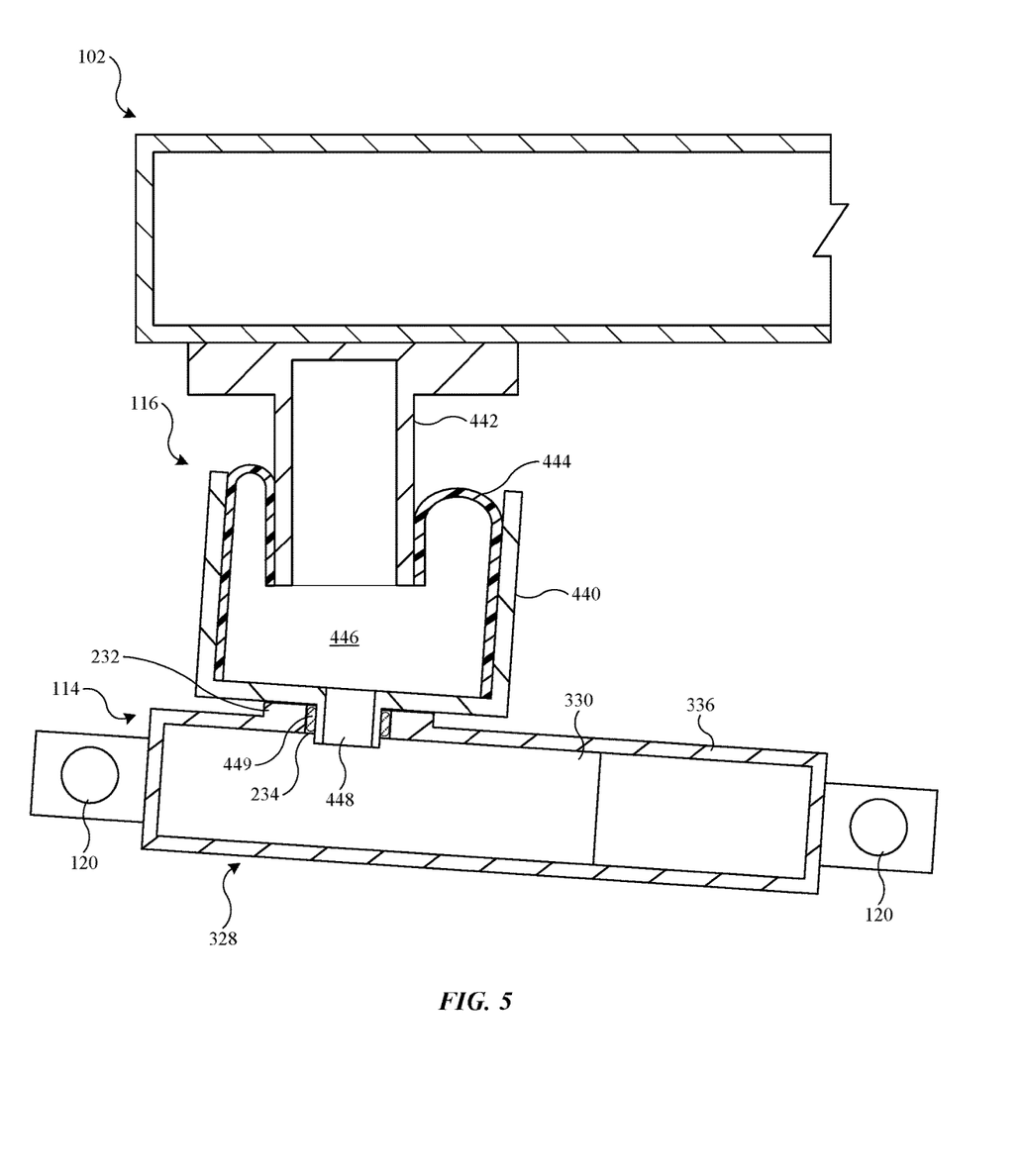
FIG. 5 is a cross-section illustration showing the air spring, the lower control arm, and the vehicle structure with the air spring in a compressed position.

FIG. 4 is a cross-section illustration showing the air spring 116, the lower control arm 114, and the vehicle structure 102 with the air spring 116 in an expanded position. FIG. 5 is a cross-section illustration showing the air spring 116, the lower control arm 114, and the vehicle structure 102 with the air spring 116 in a compressed position.

The air spring 116 includes a lower housing 440, an upper housing 442, and a flexible panel 444. The lower housing 440, the upper housing 442, and the flexible panel 444 cooperate to define an interior space 446 of the of the air spring 116 that contains a working volume of pressurized air. The air that is present within the interior space 446 of the air spring 116 may be referred to as an internal working volume of air, which is the portion of the total working volume that is contained inside the air spring 116. The total working volume of air includes the internal working volume of air from the interior space 446 of the air spring in combination with the volume of air (an external working volume of air) that is contained in the air reservoir 328.

The lower housing 440 defines a lower end portion of the air spring 116 and the upper housing 442 defines an upper end portion of the air spring 116. The lower housing 440 of the air spring 116 is a generally cylindrical structure that has an open top end. The upper housing 442 of the air spring 116 has a columnar configuration that is sized such that it may extend into the interior of the lower housing 440 through the open top end of the lower housing 440.

The flexible panel 444 is a generally annular member having an upside-down u-shaped configuration. An outer portion of the flexible panel 444 is connected to and sealed with respect to the lower housing 440. An inner portion of the flexible panel 444 is connected to and sealed with respect to the upper housing 442. Because of the upside-down u-shaped configuration of the flexible panel 444 and the flexible nature of the material (e.g., synthetic rubber) from which the flexible panel 444 is formed, the flexible panel 444 allows upward and downward translation of the upper housing 442 with respect to the lower housing 440 and allows for a limited range of rotation of the upper housing 442 with respect to the lower housing 440 (e.g., rotation as a result of the pivoting connection of the lower control arm 114 with respect to the vehicle structure 102).

An air spring port 448 is formed through the lower housing 440 for connection to the lower control arm 114. For example, the air spring 116 may be a generally cylindrical structure and the air spring port 448 may extend through the lower housing 440 in a direction that is generally aligned with the expansion and contraction direction of the air spring 116 and the air spring port 448 may be located at or near a central axis of the generally cylindrical configuration of the air spring 116. The air spring port 448 is connected to the control arm port 234 to allow fluid communication between the interior space 446 of the air spring 116 and the air reservoir 328 that is located in the lower control arm 114. In the illustrated example, the air spring port 448 is a passageway through a tubular portion of the lower housing 440 that extends into the control arm port 234 and is sealed with respect to the control arm port 234 by a sealing element 449.

The sealing element 449 may be any suitable structure or combination of structures that are able to define a substantially airtight seal between the air spring port 448 and the control arm port 234. As examples, the sealing element 449 may be an O-ring or a gasket.

During movement of the air spring 116 from the expanded position (FIG. 4) to the compressed position (FIG. 5), the lower housing 440 and the upper housing 442 move closer together, and some degree of relative rotation may occur depending on the overall configuration of the vehicle suspension system 100. The volume of the interior space 446 of the air spring 116 is reduced as a result of the movement of the lower housing 440 with respect to the upper housing 442. As a result of the reduction in volume of the interior space 446, the pressure of the air in the interior space 446 of the air spring 116 and in the air reservoir 328 of the lower control arm 114 increases. Air may also be exchanged between the interior space 446 and the air reservoir 328 as a result of this movement, for example, by travel of a portion of the air from the interior space 446 into the air reservoir 328.

During movement of the air spring 116 from the compressed position (FIG. 5) to the expanded position (FIG. 4), the lower housing 440 and the upper housing 442 move away from each other, and some degree of relative rotation may occur depending on the overall configuration of the vehicle suspension system 100. The volume of the interior space 446 of the air spring 116 is increased as a result of the movement of the lower housing 440 with respect to the upper housing 442. As a result of the increase in volume of the interior space 446, the pressure of the air in the interior space 446 of the air spring 116 and in the air reservoir 328 of the lower control arm 114 decreases. Air may also be exchanged between the interior space 446 and the air reservoir 328 as a result of this movement, for example, by travel of a portion of the air from the air reservoir 328 into the interior space 446.

Other than inclusion of the air spring port 448 to allow air to be exchanged between the interior space 446 of the air spring 116 and the air reservoir 328 that is inside the lower control arm 114, the design of the air spring 116 is conventional and other known air spring designs may be used.

Figure 6:
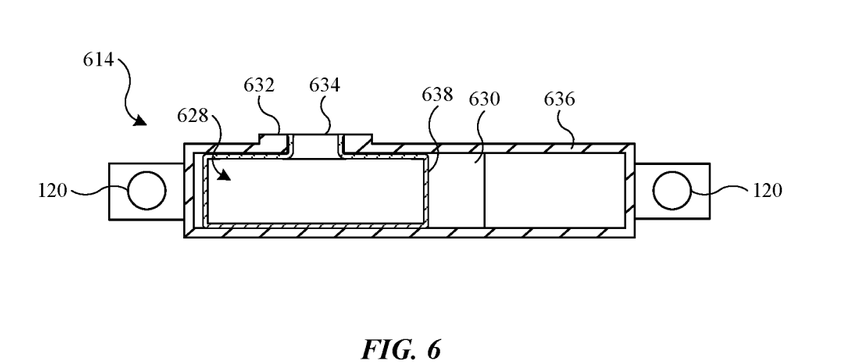
FIG. 6 is a cross-section illustration taken showing the lower a control arm according to an alternative implementation.

FIG. 6 is a cross-section illustration taken showing the lower a control arm 614 according to an alternative implementation. The lower control arm 614 can be used in the vehicle suspension system 100 in the manner described with respect to the lower control arm 114. The lower control arm 614 is similar in structure and function to the lower control arm 114 except as otherwise described herein. As examples, the lower control arm 614 includes an air reservoir 628, a hollow interior 630, a mount 632, a port 634, and wall portions 636, all of which are consistent with the descriptions of the air reservoir 328, the hollow interior 330, the mount 232, the control arm port 234, and the wall portions 336, except as otherwise described herein.

The lower control arm 614 includes an air reservoir 628 that is located inside the lower control arm 114. Instead of being defined by the hollow interior 330 of the lower control arm 614 (e.g., by sealing of the wall portions 336 such that the hollow interior 330 defines a substantially sealed volume within the lower control arm 614), the air reservoir 628 is defined by an air tank 638 that is located in the hollow interior 330 of the lower control arm 614 and is accessible through the control arm port 234 in the lower control arm 614 for fluid communication with and exchange of air with the air spring 116, for example, by establishing a sealed connection between the working volume of the air spring 116 and the air reservoir 628 defined by the air tank 638 through the control arm port 234. The air tank 638 may be any manner of vessel, container, or other structure in which an additional volume of pressurized air may be stored to provide a larger total working volume for the air spring 116.

Figure 7:
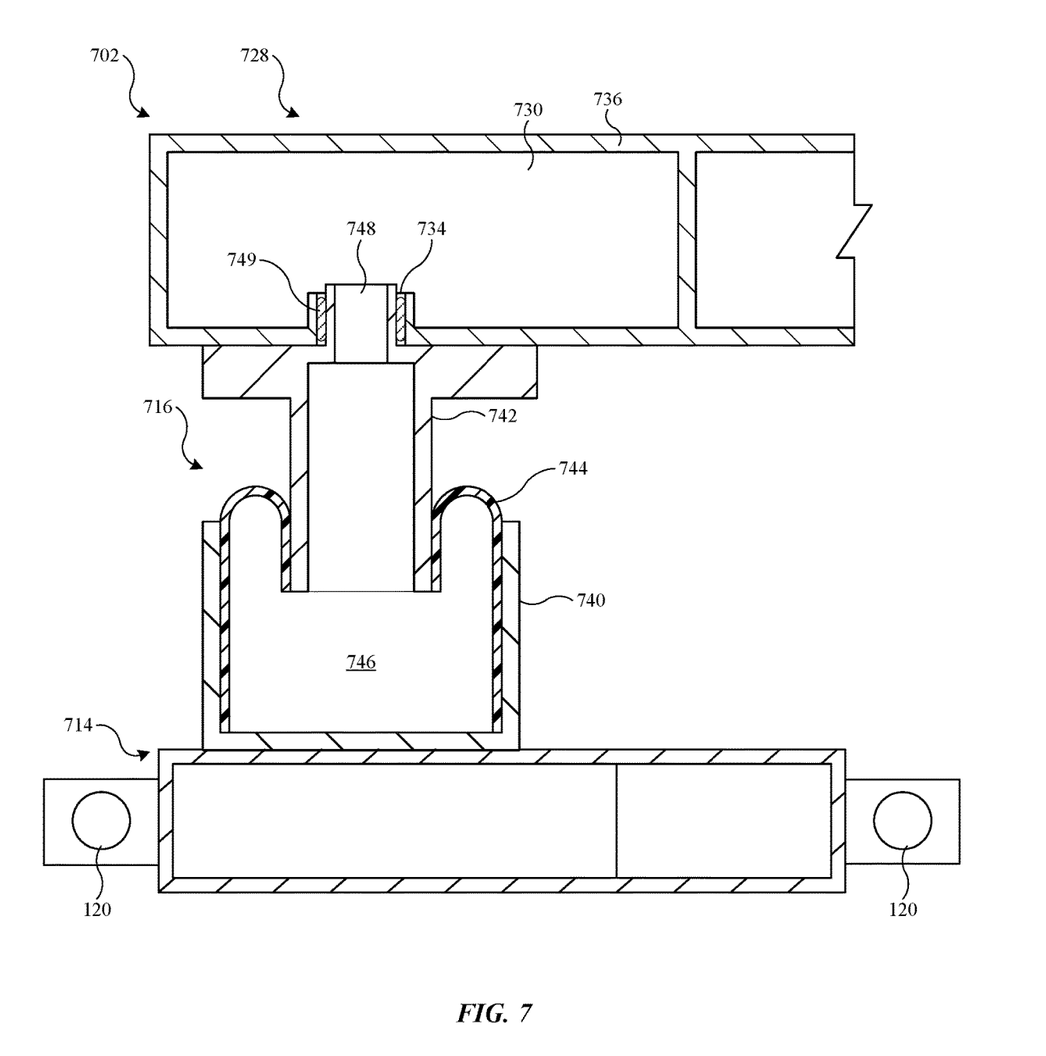
FIG. 7 is a cross-section illustration showing an air spring, a lower control arm, and a vehicle structure according to an alternative implementation with the air spring in an expanded position.
Figure 8:
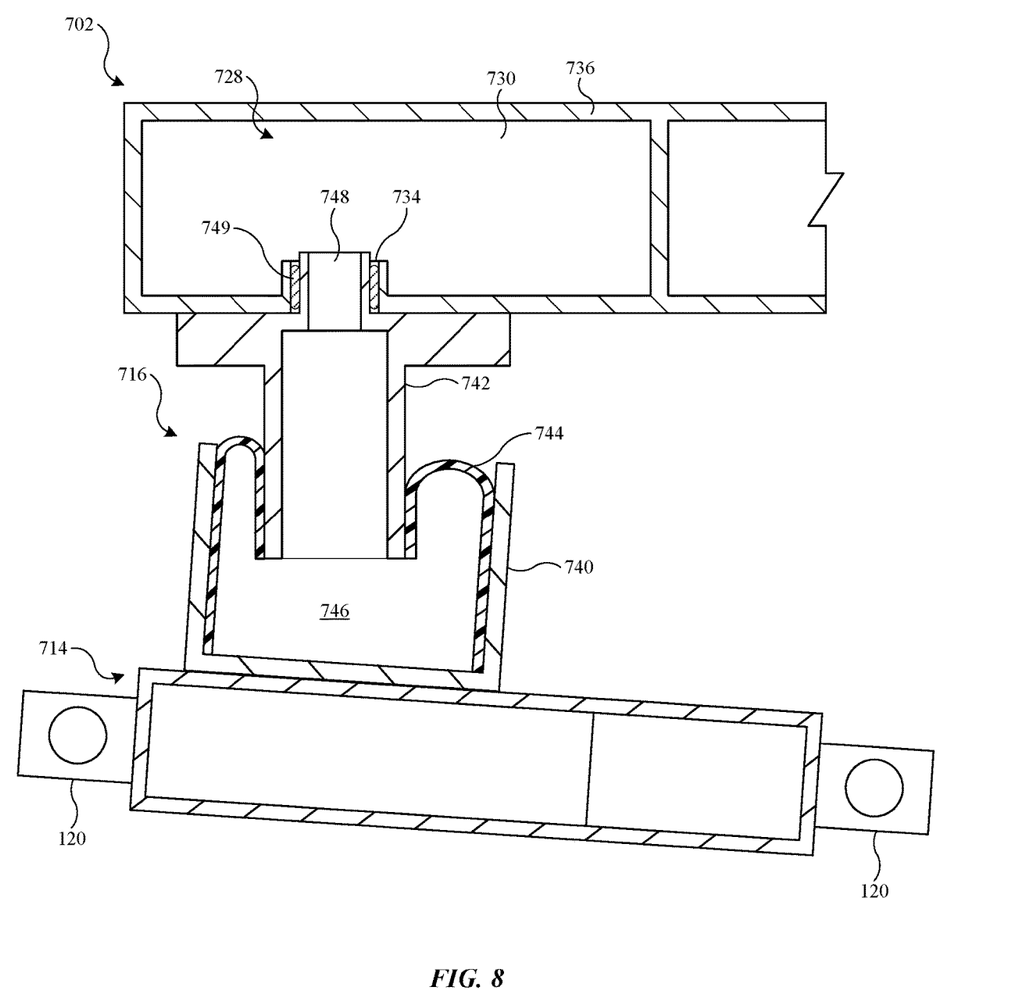
FIG. 8 is a cross-section illustration showing the air spring, the lower control arm, and the vehicle structure of FIG. 7 with the air spring in a compressed position.

FIG. 7 is a cross-section illustration showing an air spring 716, a lower control arm 714, and a vehicle structure 702 according to an alternative implementation with the air spring 716 in an expanded position. FIG. 8 is a cross-section illustration showing the air spring 716, the lower control arm 714, and the vehicle structure 702 with the air spring 716 in a compressed position. The air spring 716, the lower control arm 714, and the vehicle structure 702 are similar to the air spring 116, the lower control arm 114, and the vehicle structure 102, and the previous description of these components is applicable except as otherwise described herein. The air spring 716, the lower control arm 714, and the vehicle structure 702 differ from the air spring 116, the lower control arm 114, and the vehicle structure 102 in that an air reservoir 728 is located in the vehicle structure 102 adjacent to an end portion (e.g., a top end portion) of the air spring 716 as opposed to the air reservoir being located in the lower control arm 114 as previously described.

The vehicle structure 702 includes a hollow interior 730 that is defined by wall portions 736 that are sealed with respect to each other to define a substantially sealed space in the vehicle structure 702 that serves as the air reservoir 728. The hollow interior 730 is substantially sealed with respect to an external environment that the suspension system 100 is located in. A vehicle structure port 734 is formed through one of the wall portions 736 and is oriented toward the air spring 716 in order to allow fluid communication with the air spring 716 and exchange of air between the air reservoir 728 and the air spring 716. As an alternative to defining the air reservoir 728 in the vehicle structure 702 using the wall portions 736 of the vehicle structure 702, an air tank may be provided in the vehicle structure 702 and in communication with the vehicle structure port 734 in the manner described with respect to the air tank 638.

The air spring 716 includes a lower housing 740, an upper housing 742, and a flexible panel 744. The lower housing 740, the upper housing 742, and the flexible panel 744 cooperate to define an interior space 746 of the of the air spring 716 that contains a working volume of pressurized air. The lower housing 740 is a generally cylindrical structure that has an open top end. The upper housing 742 has a columnar configuration that is sized such that it may extend into the interior of the lower housing 740 through the open top end of the lower housing 740. The flexible panel 744 is a generally annular member having an upside-down u-shaped configuration. An outer portion of the flexible panel 744 is connected to and sealed with respect to the lower housing 740. An inner portion of the flexible panel 744 is connected to and sealed with respect to the upper housing 742. Because of the upside-down u-shaped configuration of the flexible panel 744 and the flexible nature of the material (e.g., synthetic rubber) from which the flexible panel 744 is formed, the flexible panel 744 allows upward and downward translation of the upper housing 742 with respect to the lower housing 740 and allows for a limited range of rotation of the upper housing 742 with respect to the lower housing 740 (e.g., rotation as a result of the pivoting connection of the lower control arm 714 with respect to the vehicle structure 702).

An air spring port 748 is formed through the upper housing 742 for connection to the vehicle structure port 734 of the vehicle structure 702. For example, the air spring 716 may be a generally cylindrical structure and the air spring port 748 may extend through the upper housing 742 in a direction that is generally aligned with the expansion and contraction direction of the air spring 716 and the air spring port 748 may be located at or near a central axis of the generally cylindrical configuration of the air spring 716. The air spring port 748 is connected to the vehicle structure port 734 to allow fluid communication between the interior space 746 of the air spring 716 and the air reservoir 728 that is located in the vehicle structure 702. In the illustrated example, the air spring port 748 is a passageway through a tubular portion of the upper housing 742 that extends into the vehicle structure port 734 and is sealed with respect to the vehicle structure port 734 by a sealing element 749. The sealing element 749 may be any suitable structure or combination of structures that are able to define a substantially airtight seal between the air spring port 748 and the vehicle structure port 734. As examples, the sealing element 749 may be an O-ring or a gasket.

During movement of the air spring 716 from the expanded position (FIG. 7) to the compressed position (FIG. 8), the lower housing 740 and the upper housing 742 move closer together, and some degree of relative rotation may occur depending on the overall configuration of the vehicle suspension system 100. The volume of the interior space 746 of the air spring 716 is reduced as a result of the movement of the lower housing 740 with respect to the upper housing 742. As a result of the reduction in volume of the interior space 746, the pressure of the air in the interior space 746 of the air spring 716 and in the air reservoir 728 of the vehicle structure 702 increases. Air may also be exchanged between the interior space 746 and the air reservoir 728 as a result of this movement, for example, by travel of a portion of the air from the interior space 746 into the air reservoir 728.

During movement of the air spring 716 from the compressed position (FIG. 8) to the expanded position (FIG. 7), the lower housing 740 and the upper housing 742 move away from each other, and some degree of relative rotation may occur depending on the overall configuration of the vehicle suspension system 100. The volume of the interior space 746 of the air spring 716 is increased as a result of the movement of the lower housing 740 with respect to the upper housing 742. As a result of the increase in volume of the interior space 746, the pressure of the air in the interior space 746 of the air spring 716 and in the air reservoir 728 of the vehicle structure 702 decreases. Air may also be exchanged between the interior space 746 and the air reservoir 728 as a result of this movement, for example, by travel of a portion of the air from the air reservoir 728 into the interior space 746.

Other than inclusion of the air spring port 748 to allow air to be exchanged between the interior space 746 of the air spring 716 and the air reservoir 728 that is inside the vehicle structure 702, the design of the air spring 716 is conventional and other known air spring designs may be used.

Figure 9:
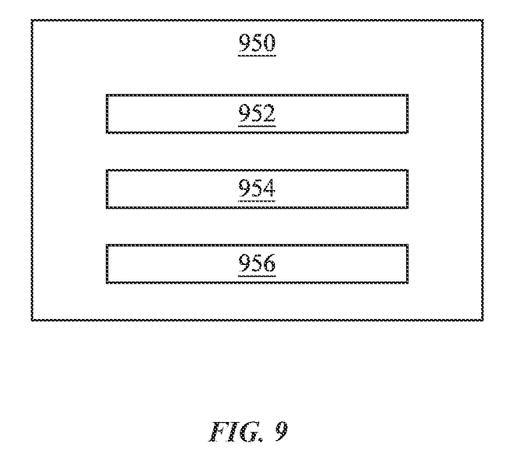
FIG. 9 is a block diagram of a vehicle.

FIG. 9 is a block diagram that shows a vehicle 950 that the vehicle suspension system 100 may be included in. In addition to the vehicle suspension system 100, the vehicle 950 may include a controller 952, sensors 954, and actuators 956. Other components may be included in the vehicle 950.

The controller 952 may be a conventional computing device (e.g., having components such as a processor and a memory) that is provided with computer program instructions that allow the controller 952 to generate commands that regulate operation of the vehicle 950. As an example, the controller 952 may generate commands to regulate operation of components of the vehicle suspension system 100, such as the air spring 116 and the active suspension actuator 118. As another example, the controller 952 may use information from the sensors 954 to control the actuators 956 in an automated or partly automated driving mode.

The commands generated by the controller 952 may be generated using sensor signals that are generated by the sensors 954 and are provided to the controller 952 as inputs. The sensors 954 may include, as examples, one or more accelerometers that measure motion of the vehicle 950 and/or various parts of the vehicle 950, one or more cameras that monitor conditions around the vehicle 950, and/or one or more three-dimensional sensors (e.g., LIDAR, structured light, etc.) that monitor conditions around the vehicle 950.

The actuators 956 are conventional. As examples, the actuators 956 may include a propulsion system, a braking system, and a steering system.

The vehicle 950 may be configured as a conventional road-going vehicle. As examples, the vehicle 950 may be configured as a passenger car, a utility vehicle, a sport utility vehicle, a truck, a bus, or a trailer.

As described above, one aspect of the present technology controlling operation of an active suspension system, which may include the gathering and use of data available from various sources to customize control of the active suspension system based on the preferences of the passengers who are in the vehicle. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information. As one example, information describing a user of the vehicle may be collected and used to adjust the ride of the vehicle based on user preferences. As another example, the vehicle may include sensors that are used to control operation of the vehicle, and these sensors may obtain information (e.g., still pictures or video images) that can be used to identify persons that are present in the vehicle or near the vehicle.

The present disclosure recognizes that the use of such personal information data, in the present technology, can be used to the benefit of users. For example, the personal information data can be used to develop a user profile that describes user comfort levels for certain types of motion of the vehicle.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the identifying content to be displayed to users, the present technology can be configured to allow users to select to "opt in" or "opt out" of participation in the collection of personal information data during registration for services or anytime thereafter. In another example, users can select not to provide personal data for use in suspension control. In yet another example, users can select to limit the length of time personal data is maintained or entirely prohibit the use and storage of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, customized suspension control can be performed using non-personal information data or a bare minimum amount of personal information, other non-personal information available to the devices, or publicly available information.

What is claimed is:

1. A vehicle suspension system, comprising:
   an air spring that supports a vehicle structure with respect to a wheel assembly, the air spring including an internal working volume;
   a structure that is connected between the air spring and the wheel assembly;
   an air reservoir that is located in the structure, wherein the air reservoir is in fluid communication with the internal working volume of the air spring to allow exchange of air between the internal working volume of the air spring and the air reservoir; and
   an active suspension actuator, with the air spring configured to carry static load applied to the wheel assembly by the vehicle structure and with the active suspension actuator configured to apply forces between the vehicle structure and the wheel assembly.

2. The vehicle suspension system of claim 1, wherein the air reservoir is defined by a hollow interior of the structure.

3. The vehicle suspension system of claim 1, wherein the air reservoir is in fluid communication with the internal working volume of the air spring through a port that is located at a bottom end of the air spring.

4. The vehicle suspension system of claim 3, wherein the air spring includes a lower housing, the air spring includes an upper housing, the air spring includes a flexible panel that is connected to the lower housing and the upper housing, and the port is formed through the lower housing.

5. The vehicle suspension system of claim 4, wherein the structure is connected to the lower housing of the air spring.

6. The vehicle suspension system of claim 4, wherein the structure is adjacent to the lower housing of the air spring.

7. The vehicle suspension system of claim 1, wherein the active suspension actuator comprises an electromagnetic linear actuator or a ball screw linear actuator.

8. The vehicle suspension system of claim 1, wherein the active suspension actuator is connected in parallel with the air spring.

9. A vehicle suspension system, comprising:
   an air reservoir;
   an air spring that supports a vehicle structure with respect to a wheel assembly, wherein the air spring includes a first port that is located at a top end portion of the air spring and an internal working volume that is in fluid communication with the air reservoir through the first port; and
   a lower control arm for connecting the vehicle structure to the wheel assembly, wherein the lower control arm is connected to a lower housing of the air spring,
   wherein the air reservoir is located in the vehicle structure adjacent the top end portion of the air spring.

10. The vehicle suspension system of claim 9, wherein the air reservoir includes a second port that is connected to the first port of the air spring.

11. The vehicle suspension system of claim 9, wherein air is exchanged between the internal working volume of the air spring and the air reservoir in response to compression and expansion of the air spring.

12. The vehicle suspension system of claim 9, wherein the air spring includes an upper housing, the air spring includes a flexible panel that is connected to the lower housing and the upper housing, and the first port is formed through the lower housing.

13. The vehicle suspension system of claim 12, wherein the air reservoir is connected to the upper housing of the air spring.

14. The vehicle suspension system of claim 9, further comprising:
 an active suspension actuator for applying forces between the vehicle structure and the wheel assembly.

15. A vehicle suspension system, comprising:
 an air spring that supports a vehicle structure and includes an internal working volume; and
 an air reservoir that is located below the air spring and is in fluid communication with the internal working volume of the air spring to define a total working volume for the air spring that includes the internal working volume and the air reservoir, wherein the air reservoir is defined by a tank that is located inside a hollow interior of the vehicle structure.

16. The vehicle suspension system of claim 15, wherein the air reservoir is defined by a hollow interior of the vehicle structure that is substantially sealed with respect to an external environment.

17. The vehicle suspension system of claim 15, wherein the air spring is connected between the vehicle structure and the air reservoir.

18. The vehicle suspension system of claim 15, wherein the air reservoir is connected between the air spring and a wheel assembly.

19. The vehicle suspension system of claim 18, further comprising an active suspension actuator for applying forces between the vehicle structure and the wheel assembly.

20. The vehicle suspension system of claim 15, wherein the air reservoir is defined by a hollow interior of a structure that is connected to the air spring.

21. The vehicle suspension system of claim 15, wherein air is exchanged between the internal working volume of the air spring and the air reservoir in response to compression and expansion of the air spring.

\* \* \* \* \*